(12) United States Patent
He et al.

(10) Patent No.: US 10,423,648 B2
(45) Date of Patent: Sep. 24, 2019

(54) METHOD, SYSTEM, AND COMPUTER READABLE MEDIUM FOR INTEREST TAG RECOMMENDATION

(71) Applicant: TENCENT TECHNOLOGY (SHENZHEN) COMPANY LIMITED, Shenzhen (CN)

(72) Inventors: Xiang He, Shenzhen (CN); Ye Wang, Shenzhen (CN); Chao Qi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 926 days.

(21) Appl. No.: 14/639,333

(22) Filed: Mar. 5, 2015

(65) Prior Publication Data

US 2015/0186503 A1 Jul. 2, 2015

Related U.S. Application Data

(63) Continuation of application No. PCT/CN2013/084096, filed on Sep. 24, 2013.

(30) Foreign Application Priority Data

Oct. 12, 2012 (CN) .......................... 2012 1 0385630

(51) Int. Cl.
*G06F 16/33* (2019.01)
*G06F 16/951* (2019.01)

(52) U.S. Cl.
CPC .......... *G06F 16/334* (2019.01); *G06F 16/951* (2019.01)

(58) Field of Classification Search
CPC . G06F 17/30675; G06F 16/334; G06F 16/951
See application file for complete search history.

(56) References Cited

U.S. PATENT DOCUMENTS

2007/0174320 A1   7/2007  Chou
2009/0248678 A1*  10/2009 Okamoto ............ G06F 17/3071
(Continued)

FOREIGN PATENT DOCUMENTS

CN   101546341 A   9/2009
CN   101782920 A   7/2010
(Continued)

OTHER PUBLICATIONS

State Intellectual Property Office of the P.R.C (SIPO) Office Action 1 for 201210385630.6 Dec. 23, 2016 9 Pages.
(Continued)

*Primary Examiner* — Boris Gorney
*Assistant Examiner* — Christy Y Kim
(74) *Attorney, Agent, or Firm* — Anova Law Group, PLLC (57) ABSTRACT

Method, system, and computer readable medium for interest tag recommendation are provided in the present disclosure. Statistics about feature words of an Internet article related to an existing interest tag are collected to generate a characteristic vector of the existing interest tag. According to the characteristic vector of the existing interest tag, degree of similarity between the existing interest tag and an interest tag to be recommended is calculated. An interest tag is recommended according to the degree of similarity between the existing interest tag and the interest tag to be recommended.

20 Claims, 4 Drawing Sheets

(56) References Cited

U.S. PATENT DOCUMENTS

2010/0023259 A1\* 1/2010 Krumm ............... G01C 21/20
701/532
2011/0072013 A1\* 3/2011 Mosoi ............... G06F 17/30702
707/736

FOREIGN PATENT DOCUMENTS

| CN | 101923545 A | 12/2010 |
|---|---|---|
| CN | 101976259 A | 2/2011 |
| CN | 102360358 A | 2/2012 |
| JP | 2001-142899 A | 5/2001 |

OTHER PUBLICATIONS

The World Intellectual Property Organization (WIPO) International Search Report for PCT/CN2013/084096 Dec. 26, 2013.

\* cited by examiner

METHOD, SYSTEM, AND COMPUTER READABLE MEDIUM FOR INTEREST TAG RECOMMENDATION

CROSS-REFERENCES TO RELATED APPLICATIONS

This application is a continuation of PCT Application No. PCT/CN2013/084096, filed on Sep. 24, 2013, which claims priority to Chinese Patent Application No. CN201210385630.6, filed on Oct. 12, 2012, the entire contents of all of which are incorporated herein by reference.

FIELD OF THE DISCLOSURE

The present disclosure relates to the field of Internet and computer technology, and more particularly, relates to an interest tag recommending method and system, and a computer readable medium, for example, by using a statistical characteristic of feature words of an Internet article related to an existing interest tag.

BACKGROUND

With continuous development of Internet technologies, a growing number of users may use the Internet for their activities including, for example, browsing news and online shopping. However, with continuous increase of information on the Internet, users may have to handle too much information content from the Internet. In order to help users with their interested information content, some Internet applications use interest tags to recommend information content to a user according to interest tags of the user.

An interest tag may include term(s)/word(s) for a user to describe the user's interest(s). For example, a user may use terms such as "basketball", "NBA", and "Jeremy Lin" as interest tags to describe own interests. Existing interest tag recommending methods include random recommendation and hot point recommendation. The random recommendation refers to recommending several interest tags to a user randomly, while the hot point recommendation refers to recommending interest tags by category to a user according to current hot events.

However, these existing recommendation methods have obvious disadvantages. The random recommendation method is lack of accuracy and has undesirable recommendation effect, and may recommend too many uninterested tags to a user. The hot point recommendation method can only include those popular interest tags and cannot make recommendations corresponding to user's selection and preference.

Therefore, there is a need to solve technical problems in the Internet and computer technology to improve accuracy for recommending interest tags to users.

BRIEF SUMMARY OF THE DISCLOSURE

According to an aspect of the present disclosure, there is provided an interest tag recommending method. Statistics about feature words of an Internet article related to an existing interest tag are collected to generate a characteristic vector of the existing interest tag. According to the characteristic vector of the existing interest tag, degree of similarity between the existing interest tag and an interest tag to be recommended is calculated. An interest tag is recommended according to the degree of similarity between the existing interest tag and the interest tag to be recommended.

According to another aspect of the present disclosure, there is provided an interest tag recommending system. The interest tag recommending system includes a characteristic vector statistics collecting module, a similarity calculating module, and an interest tag recommending module. The characteristic vector statistics collecting module is configured to collect statistics about feature words of an Internet article related to an existing interest tag to generate a characteristic vector of the existing interest tag. The similarity calculating module is configured to calculate, according to the characteristic vector of the existing interest tag, degree of similarity between the existing interest tag and an interest tag to be recommended. The interest tag recommending module is configured to recommend an interest tag according to the degree of similarity between the existing interest tag and the interest tag to be recommended.

According to another aspect of the present disclosure, there is provided a non-transitory computer readable storage medium including a computer readable program stored thereon. When being executed, the computer readable program causes a computer to implement a method for recommending an interest tag to a user. In the method, statistics about feature words of an Internet article related to an existing interest tag are collected to generate a characteristic vector of the existing interest tag. According to the characteristic vector of the existing interest tag, degree of similarity between the existing interest tag and an interest tag to be recommended is calculated. An interest tag is recommended according to the degree of similarity between the existing interest tag and the interest tag to be recommended.

BRIEF DESCRIPTION OF THE DRAWINGS

The following drawings are merely examples for illustrative purposes according to various disclosed embodiments and are not intended to limit the scope of the present disclosure. The embodiments of the present invention are described below with reference to the accompanying drawings. In these accompanying drawings.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
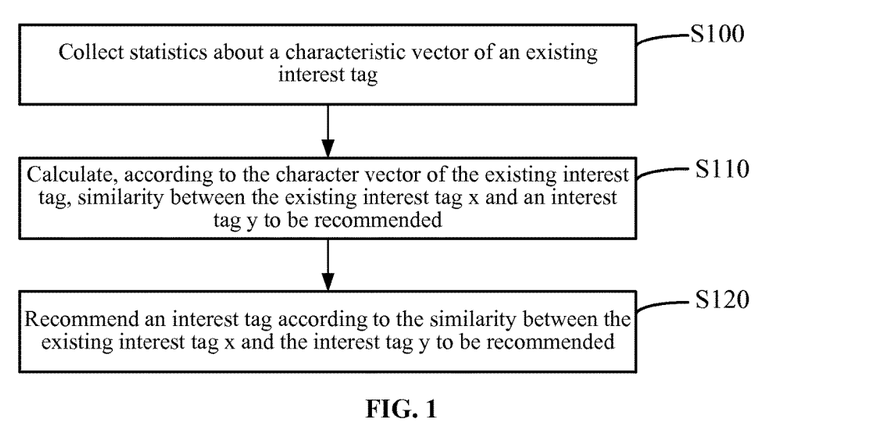
FIG. 1 is a flowchart of an interest tag recommending method according to a first embodiment of the present invention.

FIG. 1 is a flowchart of an interest tag recommending method according to a first embodiment of the present invention. Referring to FIG. 1, in step S100 of the interest tag recommending method according to the first embodiment of the present invention, statistics about feature words of an Internet article related to an existing interest tag are collected to generate a characteristic vector of the existing interest tag. Herein, the existing interest tag is an interest tag preset by a user, or an interest tag that is calculated in advance by collecting statistics about a browsing history, operations, or the like, of the user.

For example, according to this embodiment of the present invention, in step S100, in order to generate the characteristic vector of the existing interest, an interest tag recommending system according to the first embodiment of the present invention (the system is described in detail below) extracts all articles with titles or bodies including the existing interest tag, among related documents on the Internet, performs word segmentation on all the articles including the existing interest tag, extracts the feature words, and collects statistics about term frequency (Tf) of the feature word, sorts the feature words by relevance according to the Tf, and extracts a certain (or predetermined) quantity/number of feature words in a sorted sequence of the feature words as the characteristic vector Vx of the existing interest tag. For example, according to an embodiment of the present invention, feature words are sorted according to Tf*Idf (i.e., inverse document frequency), and the first 50 feature words in the sorted sequence are extracted as a characteristic vector Vx of the interest tag x. It can be understood that the quantity of the extracted words may be set as desired without limitation.

In step S110 of FIG. 1, the interest tag recommending system according to the first embodiment of the present invention calculates, according to the characteristic vector of the existing interest tag, degree of similarity between the existing interest tag x and an interest tag y to be recommended. Herein, the degree of similarity between the existing interest tag x and the interest tag y to be recommended is defined as: R(x, y)=cos(Vx, Vy), where R(x, y) represents the degree of similarity between the existing interest tag x and the interest tag y to be recommended, cos represents a cosine function, and Vx and Vy represent the characteristic vector of the existing interest tag x and a characteristic vector of the interest tag y to be recommended, respectively.

In step S120, the interest tag recommending system of the first embodiment of the present invention recommends an interest tag according to the degree of similarity between the existing interest tag x and the interest tag y to be recommended. In step S120, a threshold of the degree of similarity may be set, and an interest tag is recommended only when the degree of similarity between the existing interest tag x and the interest tag y to be recommended is greater than the set threshold. In addition, it can be understood that the threshold of the degree of similarity may be set and modified as desired.

Figure 2:
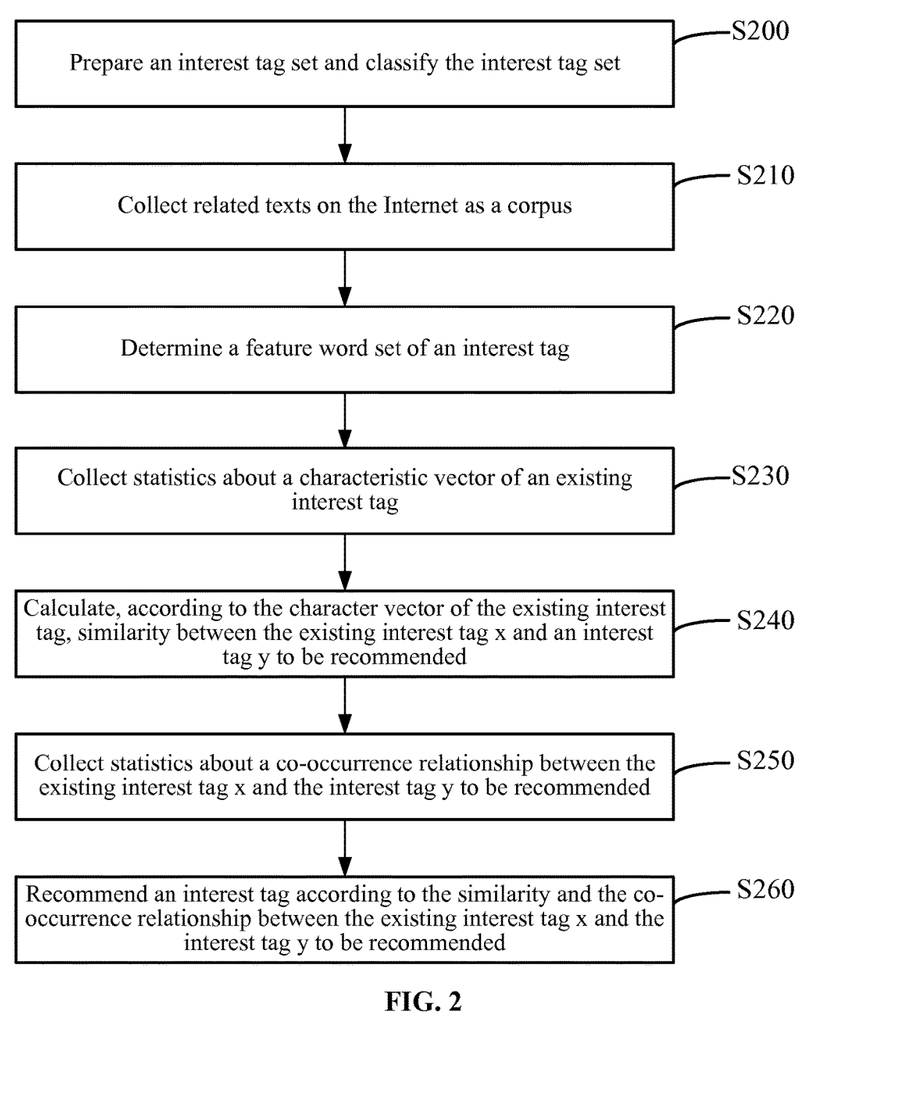
FIG. 2 is a flowchart of an interest tag recommending method according to a second embodiment of the present invention.

FIG. 2 is a flowchart of an interest tag recommending method according to a second embodiment of the present invention. In the flowchart, step S230 and step S240 are same as or similar to step S100 and step S110 in FIG. 1, respectively, and therefore, a detailed description thereof is omitted. Referring to FIG. 2, other steps in the interest tag recommending method according to the second embodiment of the present invention are described below.

In step S200, an interest tag recommending system according to the second embodiment of the present invention (the system is described in detail below) may prepare an interest tag set in advance and classify the interest tag set. In this step, for example, the interest tag recommending system may obtain an interest tag candidate set as required. An interest tag set often includes word entries related to aspects such as movie stars, sports events, and literature and art.

In step S210, the interest tag recommending system according to the second embodiment of the present invention collects related texts on the Internet as a corpus which is used to collect statistics about a relationship between interest tags. For example, according to this embodiment of the present invention, posts of a user online, for example, in a blog or on a Weibo may be used as the corpus, and other texts such as journals, moods, and/or articles of the user may also be used as the corpus.

In step S220, the interest tag recommending system according to the second embodiment of the present invention determines a feature word set. In order to determine the feature word set of the interest tag, at first, word segmentation is performed on the corpus to obtain segmented words. Statistics about an Idf value of each segmented word are collected, and a high-frequency word, a non-use word, and a low-frequency word are removed from the segmented words, and then a remaining word is used as the feature word. Herein, the document frequency refers to the number of documents in which a given word appears.

In step S250, the interest tag recommending system according to the second embodiment of the present invention collects statistics about a co-occurrence relationship between the existing interest tag x and an interest tag y to be recommended. Herein, the co-occurrence relationship between the existing interest tag x and the interest tag y to be recommended refers to the number of appearing times P(x, y) that the existing interest tag x and the interest tag y to be recommended appear in a same document. That is, P(x, y) is the number of documents in the corpus, which include both the tag word x and the tag word y. P(x) is the number of documents, which include the tag word x, in the corpus.

In step S260, the interest tag recommending system of the second embodiment of the present invention recommends an interest tag according to the degree of similarity and according to the co-occurrence relationship between the existing interest tag x and the interest tag y to be recommended. For example, according to this embodiment of the present invention, a tag is recommended in the following manner. For example, K1, K2, and K3 are set as predetermined thresholds. When the interest tag y to be recommended satisfies the following conditions: R(x, y)>K1 (i.e., the degree of similarity R(x, y) between the existing interest tag x and the interest tag y to be recommended is greater than K1); P(x, y)>K3 (P(x, y) is the number of appearing times that the existing interest tag x and the interest tag y to be recommended co-occur in the corpus), and M(x, y)=P(x, y)/(P(x)*P(y))>K2, the interest tag y is recommended to the user.

It should be noted that if it is known that a user is interested in multiple existing interest tags $x_1, x_2, \ldots x_n$, according to an embodiment of the present invention, respective interest tags $y_i$ related to the existing interest tags $x_i$ (i=1, . . . , n) may be recommended to the user, and a greater number of times that an interest tag $y_i$ to be recommended appears in a related list of interest tags to be recommended of the user indicates a greater probability that the user is interested in the interest tag $y_i$ to be recommended.

Figure 3:
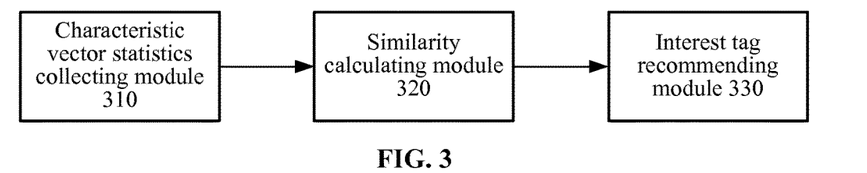
FIG. 3 is a schematic structural diagram of an interest tag recommending system according to a first embodiment of the present invention.

FIG. 3 is a schematic structural diagram of an interest tag recommending system according to a first embodiment of the present invention. Referring to FIG. 3, the interest tag recommending system of the first embodiment of the present invention includes a characteristic vector statistics collecting module 310, a similarity calculating module 320, and an interest tag recommending module 330.

The characteristic vector statistics collecting module 310 of the interest tag recommending system of the first embodiment of the present invention is configured to collect statistics about feature words of an Internet article related to an existing interest tag to generate a characteristic vector of the existing interest tag. Herein, the existing interest tag is an interest tag preset by a user, or an interest tag that is calculated in advance by collecting statistics about a browsing history, operations, or the like of the user.

Specifically, the characteristic vector statistics collecting module 310 of the interest tag recommending system of the first embodiment of the present invention may extract all articles with titles or bodies including the existing interest tag, among related documents on the Internet, perform word segmentation on all the articles including the existing interest tag, extract the feature words, and collect statistics about Tf of the feature words, sort the feature words by relevance according to the Tf, and extract a certain (or predetermined) quantity/number of feature words in a sorted sequence of the feature words as the characteristic vector Vx of the existing interest tag.

In addition, the similarity calculating module 320 of the interest tag recommending system of the first embodiment of the present invention is configured to calculate, according to the characteristic vector of the existing interest tag, degree of similarity between the existing interest tag x and an interest tag y to be recommended. The degree of similarity between the existing interest tag x and the interest tag y to be recommended is defined as: $R(x, y)=\cos(Vx, Vy)$, where $R(x, y)$ represents the degree of similarity between the existing interest tag x and the interest tag y to be recommended, cos represents a cosine function, and Vx and Vy represent the characteristic vector of the existing interest tag x and a characteristic vector of the interest tag y to be recommended, respectively.

In addition, the interest tag recommending module 330 is configured to recommend an interest tag according to the degree of similarity between the existing interest tag x and the interest tag y to be recommended. The interest tag recommending module 330 determines whether to recommend the interest tag y according to whether the degree of similarity between the existing interest tag x and the interest tag y to be recommended is greater than a set threshold. It can be understood that the degree of similarity threshold may be set and modified as desired.

Figure 4:
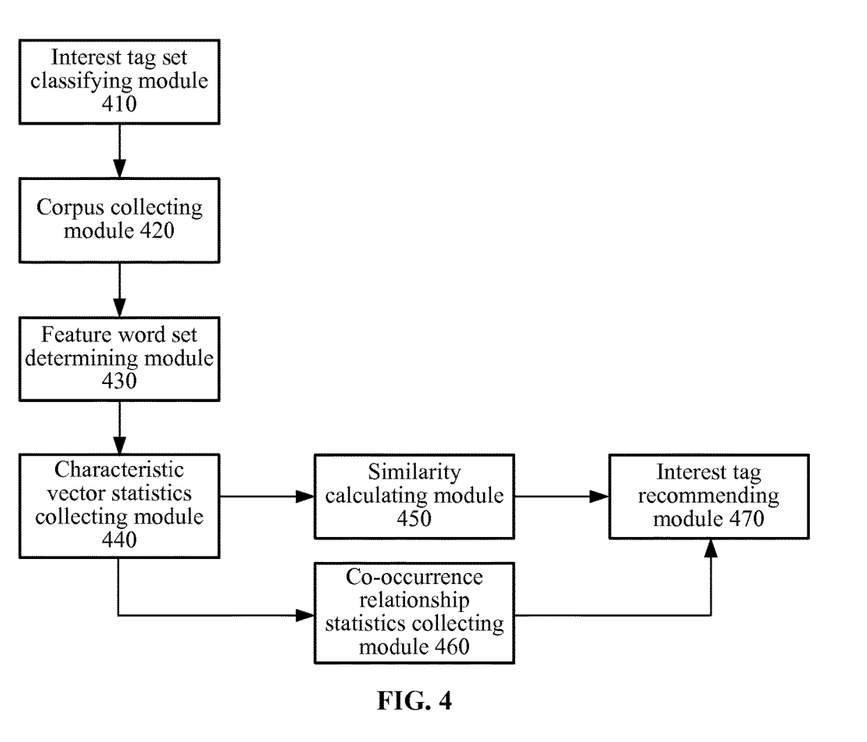
FIG. 4 is a schematic structural diagram of an interest tag recommending system according to a second embodiment of the present invention.

FIG. 4 is a schematic structural diagram of an interest tag recommending system according to a second embodiment of the present invention. The interest tag recommending system of the second embodiment of the present invention includes an interest tag set classifying module 410, a corpus collecting module 420, a feature word set determining module 430, a characteristic vector statistics collecting module 440, a similarity calculating module 450, a co-occurrence relationship statistics collecting module 460 and an interest tag recommending module 470.

In the interest tag recommending system of the second embodiment of the present invention, the interest tag set classifying module 410 is configured to prepare an interest tag set in advance and classify the interest tag set. For example, the interest tag set classifying module 410 may obtain an interest tag candidate set as desired. An interest tag set often includes word entries related to aspects such as movie stars, sports events, and literature and art.

In addition, the corpus collecting module 420 is configured to collect related texts on the Internet as a corpus. For example, the corpus collecting module 420 is configured to collect related texts on the Internet as the corpus, to collect statistics about a relationship between interest tags. For example, posts of a user in a blog or on Weibo may be used as the corpus, and other texts such as journals, moods, or articles of the user may also be used as the corpus.

In addition, the feature word set determining module 430 is configured to determine a feature word set of the interest tag. For example, the feature word set determining module 430 may perform operations such as word segmentation on the corpus, collecting statistics about an Idf value of each word, and removing a high-frequency word, a non-use word, and a low-frequency word, and then use a remaining word as the feature word.

In addition, the characteristic vector statistics collecting module 440 is configured to collect statistics about feature words of an Internet article related to an existing interest tag to generate a characteristic vector of the existing interest tag. Herein, the existing interest tag is an interest tag preset by a user, or an interest tag that is calculated in advance by collecting statistics about a browsing history, operations, or the like of the user. Specifically, the characteristic vector statistics collecting module 440 may extract all articles, whose titles or bodies include the existing interest tag, among related documents on the Internet, perform word segmentation on all the articles including the existing interest tag, extract the feature words, and collect statistics about Tf of the feature words, sort the feature words by relevance according to the Tf, and extract a certain quantity of feature words in a sorted sequence of the feature words as the characteristic vector Vx of the existing interest tag.

In addition, the similarity calculating module 450 is configured to calculate, according to the characteristic vector of the existing interest tag, degree of similarity between the existing interest tag x and an interest tag y to be recommended.

In addition, the co-occurrence relationship statistics collecting module 460 is configured to collect statistics about a co-occurrence relationship between the existing interest tag x and the interest tag y to be recommended. Herein, the co-occurrence relationship between the existing interest tag x and the interest tag y to be recommended refers to the number of appearing times $P(x, y)$ that the existing interest tag x and the interest tag y to be recommended appear in a same document, that is, $P(x, y)$ is the number of documents, which include both the tag word x and the tag word y, in the corpus, where $P(x)$ is the number of documents, which include the tag word x, in the corpus.

The interest tag recommending module 470 is configured to recommend an interest tag according to the degree of similarity and the co-occurrence relationship between the existing interest tag x and the interest tag y to be recommended. For example, the interest tag recommending module may further recommend a tag in the following manner.

For example, K1, K2, and K3 are set as predetermined thresholds. When the interest tag y to be recommended satisfies the following conditions: $R(x, y) > K1$ (i.e., the degree of similarity $R(x, y)$ between the existing interest tag x and the interest tag y to be recommended is greater than K1); $P(x, y) > K3$ ($P(x, y)$ is the number of appearing times that the existing interest tag x and the interest tag y to be recommended co-occur in the corpus), and $M(x, y)=P(x, y)/(P(x)*P(y)) > K2$, the interest tag y is recommended to the user.

In addition, if it is known that a user is interested in multiple existing interest tags $x_1, x_2, \ldots x_n$, according to an embodiment of the present invention, respective interest tags $y_i$ related to the existing interest tags $x_i$ (i=1, \ldots, n) may be recommended to the user, and a greater number of times that an interest tag $y_i$ to be recommended appears in a related list of interest tags to be recommended of the user indicates a greater probability that the user is interested in the interest tag $y_i$ to be recommended.

By using the foregoing embodiments of the present invention, according to an existing interest tag, statistics about degree of similarity between the interest tag and other tags may be collected, and an interest tag is recommended, so that relevance of recommendation is improved, and interferences of uninterested information to the user is reduced. Moreover, in the foregoing embodiments of the present invention, reference is also made to a co-occurrence relationship between tags when an interest tag is recommended, so that the recommendation is more accurate.

In addition, according to an embodiment of the present invention, the interest tag recommending methods shown in FIG. 1 and FIG. 2 may be interest tag recommending methods that are separately executed by corresponding modules in the interest tag recommending systems shown in FIG. 3 and FIG. 4. Moreover, according to another embodiment of the present invention, some or all modules in the interest tag recommending systems shown in FIG. 3 and FIG. 4 may be combined into one or several other modules, or one or some modules may further be split into multiple smaller functional modules.

According to another embodiment of the present invention, a computing device such as a computer can be used to implement the disclosed interest tag recommending methods shown in FIG. 1 and FIG. 2. Such a computer may include processing elements and storage elements such as a central processing unit (CPU), a random access memory (RAM), and a read-only memory (ROM), to constitute the interest tag recommending systems shown in FIG. 3 and FIG. 4, and to implement the interest tag recommending methods according to the embodiments of the present invention. A computer program may be recorded on, for example, a non-transitory computer readable recording medium. The computer program may be loaded in the computer by using the computer readable recording medium. The computer program may be executed to cause the computer (e.g., CPU or processors) to perform the methods disclosed herein.

Figure 5:
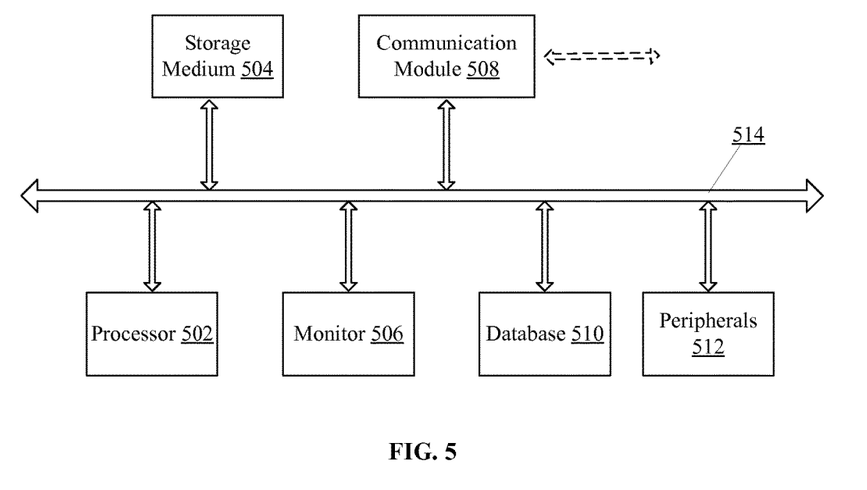
FIG. 5 illustrates an exemplary computing device consistent with the disclosed embodiments.

For example, FIG. 5 illustrates an exemplary computing device capable of implementing the disclosed methods, consistent with the disclosed embodiments. As shown in FIG. 5, the exemplary computing device 500 may include a processor 502, a storage medium 504, a monitor 506, a communication module 508, a database 510, peripherals 512, and one or more bus 514 to couple the devices together. Certain devices may be omitted and other devices may be included.

Processor 502 may include any appropriate processor or processors. Further, processor 502 may include multiple cores for multi-thread or parallel processing. The processor 502 may be used to run computer program(s) stored in the storage medium 504. Storage medium 504 may include memory modules, such as ROM, RAM, and flash memory modules, and mass storages, such as CD-ROM, U-disk, removable hard disk, etc. Storage medium 504 may store computer programs for implementing various disclosed processes, when executed by processor 502. In one embodiment, storage medium 504 may be a non-transient computer-readable storage medium having a computer program stored thereon, when being executed, to cause the computer to implement the disclosed methods.

Further, peripherals 512 may include I/O devices such as keyboard and mouse, and communication module 508 may include network devices for establishing connections, e.g., through a communication network such as the Internet.

Database 510 may include one or more databases for storing certain data and for performing certain operations on the stored data, such as webpage browsing, database searching, etc.

In this manner, according to an existing interest tag, statistics about degree of similarity between the existing interest tag and other interest tags and about a co-occurrence relationship between the existing interest tag and the other interest tags are collected, a suitable interest tag is recommended among the other interest tags according to the degree of similarity and the co-occurrence relationship. Accuracy of interest tag recommendation can be improved.

As such, the present disclosure provides methods, systems, computers, and computer-readable storage media for recommending an interest tag to users by collecting statistics about feature words of an Internet article related to an existing interest tag, so as to improve the accuracy of interest tag recommendation to users to solve technical problems in the Internet and computer technology.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. An interest tag recommending method, comprising:
preparing an interest tag set and classifying the interest tag set, wherein the classified interest tag set comprises the interest tag;
collecting related texts on the Internet as a corpus;
performing word segmentation on the corpus to obtain segmented words,
collecting statistics about an inverse document frequency value of each segmented word;
collecting statistics about feature words of an Internet article related to an existing interest tag to generate a first characteristic vector of the existing interest tag, comprising:
  performing word segmentation on all the articles comprising the existing interest tag,
  extracting the feature words, and collecting statistics about term frequency of the feature words; and
  sorting the feature words based on a product of the inverse document frequency value and the term frequency;
calculating, according to the first characteristic vector of the existing interest tag and a second characteristic vector of an interest tag to be recommended, degree of similarity between the existing interest tag and the interest tag to be recommended as: $R(x, y)=\cos(Vx, Vy)$, wherein $R(x, y)$ represents the degree of similarity between the existing interest tag x and the interest tag y to be recommended, cos represents a cosine function, Vx represents the first characteristic vector of the existing interest tag x, and Vy represents the second characteristic vector of the interest tag y to be recommended;
obtaining number of documents including both the existing interest tag x and the interest tag y to be recommended in the corpus denoted as $P(x, y)$, a number of documents including the existing interest tag x in the corpus denoted as $P(x)$, and a number of documents including the interest tag y to be recommended in the corpus denoted as $P(y)$; and
recommending an interest tag according to $R(x, y)$, $P(x, y)$, $P(x)$ and $P(y)$ that satisfy a plurality of conditions including: $R(x, y)>K1$, $P(x, y)>K2$ and $P(x, y)/(P(x)$

*P(y))>K3, wherein K1, K2 and K3 are predefined threshold values, the recommended interested tag is obtained based on calculation of the degree of similarity between the existing interest tag and the interest tag to be recommended, and a co-occurrence relationship between the existing interest tag and the interest tag to be recommended is collected to improve an accuracy of interest tag recommendation to users.

2. The interest tag recommending method according to claim 1, further comprising:
collecting statistics about a co-occurrence relationship between the existing interest tag and the interest tag to be recommended, wherein the co-occurrence relationship refers to appearing times that the existing interest tag and the interest tag to be recommended appear in a same document; and
recommending the interest tag according to the degree of similarity between the existing interest tag and the interest tag to be recommended, and according to the co-occurrence relationship between the existing interest tag and the interest tag to be recommended.

3. The interest tag recommending method according to claim 2, wherein the step of the collecting the statistics about the feature words of the Internet article related to the existing interest tag to generate the first characteristic vector of the existing interest tag further comprises:
extracting all articles containing the existing interest tag in titles or bodies thereof, among related documents on the Internet; and
sorting the feature words by relevance according to the term frequency, and extracting a predetermined quantity of feature words from the sorted feature words as the first characteristic vector of the interest tag.

4. The interest tag recommending method according to claim 2, wherein, before the step of the collecting the statistics about the feature words of the Internet article related to the existing interest tag to generate the first characteristic vector of the existing interest tag, the method further comprises:
determining a feature word set of the interest tag according to the corpus, wherein:
the feature word set comprises the feature word.

5. The interest tag recommending method according to claim 4, wherein the step of determining the feature word set of the interest tag comprises:
removing a high-frequency word, a non-use word, and a low-frequency word from the segmented words, and using a remaining word as the feature word.

6. The interest tag recommending method according to claim 1, wherein the step of the collecting the statistics about the feature words of the Internet article related to the existing interest tag to generate the first characteristic vector of the existing interest tag further comprises:
extracting all articles containing the existing interest tag in titles or bodies thereof, among related documents on the Internet; and
sorting the feature words by relevance according to the term frequency, and extracting a predetermined quantity of feature words from the sorted feature words as the first characteristic vector of the interest tag.

7. The interest tag recommending method according to claim 1, wherein, before the step of the collecting the statistics about the feature words of the Internet article related to the existing interest tag to generate the first characteristic vector of the existing interest tag, the method further comprises:
determining a feature word set of the interest tag according to the corpus, wherein:
the feature word set comprises the feature word.

8. The interest tag recommending method according to claim 7, wherein the step of determining the feature word set of the interest tag comprises:
removing a high-frequency word, a non-use word, and a low-frequency word from the segmented words, and using a remaining word as the feature word.

9. An interest tag recommending system, comprising:
a memory;
a processor coupled to the memory;
wherein the processor is configured to:
prepare an interest tag set, and to classify the interest tag set, wherein the classified interest tag set comprises the interest tag;
collect related texts on the Internet as a corpus;
perform word segmentation on the corpus to obtain segmented words;
collect statistics about an inverse document frequency value of each segmented word;
collect statistics about feature words of an Internet article related to an existing interest tag to generate a first characteristic vector of the existing interest tag, wherein generating the first characteristic vector of the existing interest tag comprises:
performing word segmentation on all the articles comprising the existing interest tag,
extract the feature words, and collect statistics about term frequency of the feature words; and
sorting the feature words based on a product of the inverse document frequency value and the term frequency;
calculate, according to the first characteristic vector of the existing interest tag and a second characteristic vector of an interest tag to be recommended, degree of similarity between the existing interest tag and the interest tag to be recommended as: $R(x, y)=\cos(Vx, Vy)$, wherein $R(x, y)$ represents the degree of similarity between the existing interest tag x and the interest tag y to be recommended, cos represents a cosine function, Vx represents the first characteristic vector of the existing interest tag x, and Vy represents the second characteristic vector of the interest tag y to be recommended;
obtaining number of documents including both the existing interest tag x and the interest tag y to be recommended in the corpus denoted as P(x, y), a number of documents including the existing interest tag x in the corpus denoted as P(x), and a number of documents including the interest tag y to be recommended in the corpus denoted as P(y); and
recommend an interest tag according to R(x, y), P(x, y), P(x) and P(y) that satisfy a plurality of conditions including: R(x, y)>K1, P(x, y)>K2 and P(x, y)/(P(x)*P(y))>K3, wherein K1, K2 and K3 are predefined threshold values, the recommended interested tag is obtained based on calculation of the degree of similarity between the existing interest tag and the interest tag to be recommended, and a co-occurrence relationship between the existing interest tag and the interest tag to be recommended is collected to improve an accuracy of interest tag recommendation to users.

10. The interest tag recommending system according to claim 9, wherein the processor is further configured to:

collect statistics about a co-occurrence relationship between the existing interest tag and the interest tag to be recommended, wherein the co-occurrence relationship refers to the number of appearing times that the existing interest tag and the interest tag to be recommended appear in a same document, wherein recommend the interest tag according to the degree of similarity between the existing interest tag and the interest tag to be recommended, and according to the co-occurrence relationship between the existing interest tag and the interest tag to be recommended.

11. The interest tag recommending system according to claim 10, wherein the processor is further configured to:
extract all articles containing the existing interest tag in titles or bodies thereof, among related documents on the Internet; and
sort the feature words by relevance according to the term frequency, and extract a predetermined quantity of feature words from the sorted feature words as the first characteristic vector of the interest tag.

12. The interest tag recommending system according to claim 10, wherein the processor is further configured to:
determine a feature word set of the interest tag according to the corpus, wherein
the feature word set comprises the feature word.

13. The interest tag recommending system according to claim 9, wherein the processor is further configured to:
extract all articles containing the existing interest tag in titles or bodies thereof, among related documents on the Internet; and
sort the feature words by relevance according to the term frequency, and extract a predetermined quantity of feature words from the sorted feature words as the first characteristic vector of the interest tag.

14. The interest tag recommending system according to claim 9, wherein the processor is further configured to:
determine a feature word set of the interest tag according to the corpus, wherein
the feature word set comprises the feature word.

15. The interest tag recommending system according to claim 14, wherein the processor is further configured to remove a high-frequency word, a non-use word, and a low-frequency word from the segmented words, and to use a remaining word as the feature word.

16. A non-transitory computer readable storage medium comprising a computer readable program stored thereon, wherein, when being executed, the computer readable program causes a computer to implement a method for recommending an interest tag to a user, the method comprising:
preparing an interest tag set and classifying the interest tag set, wherein the classified interest tag set comprises the interest tag;
collecting related texts on the Internet as a corpus;
performing word segmentation on the corpus to obtain segmented words,
collecting statistics about an inverse document frequency value of each segmented word;
collecting statistics about feature words of an Internet article related to an existing interest tag to generate a first characteristic vector of the existing interest tag, comprising:
performing word segmentation on all the articles comprising the existing interest tag,
extracting the feature words, and collecting statistics about term frequency of the feature words;
sorting the feature words based on a product of the inverse document frequency value and the term frequency;
calculating, according to the first characteristic vector of the existing interest tag and a second characteristic vector of an interest tag to be recommended, degree of similarity between the existing interest tag and the interest tag to be recommended as: $R(x, y)=\cos(Vx, Vy)$, wherein $R(x, y)$ represents the degree of similarity between the existing interest tag x and the interest tag y to be recommended, cos represents a cosine function, Vx represents the first characteristic vector of the existing interest tag x, and Vy represents the second characteristic vector of the interest tag y to be recommended;
obtaining number of documents including both the existing interest tag x and the interest tag y to be recommended in the corpus denoted as $P(x, y)$, a number of documents including the existing interest tag x in the corpus denoted as $P(x)$, and a number of documents including the interest tag y to be recommended in the corpus denoted as $P(y)$; and
recommending an interest tag according to $R(x, y)$, $P(x, y)$, $P(x)$ and $P(y)$ that satisfy a plurality of conditions including: $R(x, y)>K1$, $P(x, y)>K2$ and $P(x, y)/(P(x)*P(y))>K3$, wherein K1, K2 and K3 are predefined threshold values, the recommended interested tag is obtained based on calculation of the degree of similarity between the existing interest tag and the interest tag to be recommended, and a co-occurrence relationship between the existing interest tag and the interest tag to be recommended is collected to improve an accuracy of interest tag recommendation to users.

17. The medium according to claim 16, wherein the method further comprises:
collecting statistics about a co-occurrence relationship between the existing interest tag and the interest tag to be recommended, wherein the co-occurrence relationship refers to appearing times that the existing interest tag and the interest tag to be recommended appear in a same document; and
recommending the interest tag according to the degree of similarity between the existing interest tag and the interest tag to be recommended, and according to the co-occurrence relationship between the existing interest tag and the interest tag to be recommended.

18. The medium according to claim 17, wherein the step of the collecting the statistics about the feature words of the Internet article related to the existing interest tag to generate the first characteristic vector of the existing interest tag further comprises:
extracting all articles containing the existing interest tag in titles or bodies thereof, among related documents on the Internet; and
sorting the feature words by relevance according to the term frequency, and extracting a predetermined quantity of feature words from the sorted feature words as the first characteristic vector of the interest tag.

19. The medium according to claim 17, wherein, before the step of the collecting the statistics about the feature words of the Internet article related to the existing interest tag to generate the first characteristic vector of the existing interest tag, the method further comprises:
determining a feature word set of the interest tag according to the corpus, wherein:
the feature word set comprises the feature word.

20. The medium according to claim 19, wherein the step of determining the feature word set of the interest tag comprises:
   removing a high-frequency word, a non-use word, and a low-frequency word from the segmented words, and using a remaining word as the feature word.

* * * * *